(12) United States Patent
Narayan et al.

(10) Patent No.: US 7,589,222 B2
(45) Date of Patent: Sep. 15, 2009

(54) TRIGLYCERIDES AND METHOD OF PREPARATION THEREOF

(75) Inventors: Ramani Narayan, Okemos, MI (US); Daniel Graiver, Midland, MI (US); Kenneth W. Farminer, Midland, MI (US); Phuong T. Tran, Lansing, MI (US); Tam Tran, legal representative, Lansing, MI (US)

(73) Assignees: Board of Trustees of Michigan State University, East Lansing, MI (US); Bioplastic Polymers and Composites, LLC, Okemos, MI (US)

( * ) Notice: Subject to any disclaimer, the term of this patent is extended or adjusted under 35 U.S.C. 154(b) by 234 days.

(21) Appl. No.: 11/363,101

(22) Filed: Feb. 27, 2006

(65) Prior Publication Data

US 2006/0194974 A1 Aug. 31, 2006

Related U.S. Application Data

(60) Provisional application No. 60/656,678, filed on Feb. 28, 2005.

(51) Int. Cl.
*C07C 51/16* (2006.01)
*C07C 51/34* (2006.01)

(52) U.S. Cl. .................................... 554/133
(58) Field of Classification Search ............ None
See application file for complete search history.

(56) References Cited

U.S. PATENT DOCUMENTS

| | | | |
|---|---|---|---|
| 3,006,772 A * | 10/1961 | Martinus et al. | ............ 426/604 |
| 3,112,329 A | 11/1963 | Pryde et al. | |
| 3,350,336 A | 10/1967 | Kelley et al. | |
| 3,647,759 A | 3/1972 | Walker | |
| 3,929,730 A | 12/1975 | Graefe et al. | |
| 3,993,576 A | 11/1976 | Barron | |
| 4,048,104 A | 9/1977 | Svoboda et al. | |
| 4,237,238 A | 12/1980 | DeGiuseppi et al. | |
| 4,282,387 A | 8/1981 | Olstowski et al. | |
| 4,314,088 A | 2/1982 | Austin et al. | |
| 4,326,047 A | 4/1982 | Yates et al. | |
| 4,346,229 A | 8/1982 | Derr et al. | |
| 4,416,747 A | 11/1983 | Menth et al. | |
| 5,099,075 A | 3/1992 | Katz et al. | |
| 6,433,121 B1 | 8/2002 | Petrovic | |

FOREIGN PATENT DOCUMENTS

BR PI 0005479-8 4/2002
WO WO 0249999 6/2002

OTHER PUBLICATIONS

Tran et al., JAOCS, vol. 82, No. 9, pp. 653-659, 2005.*
Chem. Abstr. of JPO-50-052400, May 1975.*
Rheineck et al., JAOCS, vol. 46, pp. 452-454.*
Guo et al. in the Journal of Polym. and the Environ. 10: 49-52 (2002).
R.G. Ackman, M.E. Retson, L.R. Gallay, and F.A. Vandenheuvel, Ozonolysis of Unsaturated Fatty Acids, Can. J. Chem. vol. 39 (1961).
J.D. Castell and R.G. Ackman, Ozonolysis of Unsaturated Fatty Acids. II. Esterification of the total products from the oxidative decomposition of ozonides with 2,2-dimethoxypropane, Can. J. Chem. vol. 45 (1967).

* cited by examiner

*Primary Examiner*—Deborah D Carr
(74) *Attorney, Agent, or Firm*—Ian C. McLeod

(57) ABSTRACT

A process for the preparation of new polyols from a natural oil is described. The process involves ozone cleavage of double bonds in the fatty acid chains of the oils along with coupling of a di or polyol to the cleaved ends of the molecules resulting from the cleavage with a base. The resulting polyols are as intermediates for polymers.

37 Claims, No Drawings

TRIGLYCERIDES AND METHOD OF PREPARATION THEREOF

CROSS-REFERENCE TO RELATED APPLICATIONS

This application claims priority to provisional Application Ser. No. 60/656,678, filed Feb. 28, 2005.

STATEMENT REGARDING FEDERALLY SPONSORED RESEARCH OR DEVELOPMENT

Not Applicable

STATEMENT REGARDING GOVERNMENT RIGHTS

Not Applicable

BACKGROUND OF THE INVENTION (1) Field of the Invention

The present invention relates to a process for producing a mixture of polyols containing relatively higher molecular weight triglyceride based polyols and a relatively lower molecular weight linear polyols. More specifically, the invention is related to such polyols derived from bio-renewable resources such as vegetable oils.

(2) Description of the Related Art

Mixtures of polyols are commonly used in the manufacturing of polyurethane and polyester articles resulting from the reaction of liquid polyol mixtures and liquid isocyanates or carboxylates, respectively. Mixtures of primary hydroxyl terminated functional groups in polyols are desirable in commerce as they undergo rapid polymerization processes and their compositions greatly impact the physical properties of the polymeric articles. Commonly employed polyol mixtures consist of blends of low equivalent weight glycols such as ethylene glycol or 1,4 butanediol and primary hydroxyl terminated high molecular-weight polyether polyols. However, many such blends are incompatible fluids that tend to separate into layers on standing and thus, these blends should be constantly agitated to avoid a misformulation of the polymer because of the separation of components. Even more compounds in the blends to migrate into one of the phases and adversely impact the polymerization process. Recognition of this problem dictates that polyol blends containing low molecular weight polyols and high molecular weight polyols should be constantly agitated or alternatively a "chain extender" or a "solubilizer" should be employed.

A "chain extender" is disclosed by Graefe et al. in U.S. Pat. No. 3,929,730 issued Dec. 30, 1975 incorporated herein by reference in its entirety. This patent teaches the use of blends consisting of 1,4 butanediol with high molecular weight polyols having molecular weights of 2,000 or greater where a sufficient amount of phenylenediethanolamine is used as an extruder to render the mixture homogeneous. Similarly, a "solubilizer" derived from butylene glycol or propylene glycol is disclosed in U.S. Pat. No. 3,993,576 to Barron and is claimed to render the polyol mixture resistant to phase separations.

Olstowski and Nafziger in U.S. Pat. No. 4,282,387, issued Aug. 4, 1981, incorporated herein by reference in its entirety1, disclosed the preparation of a mixture of polyether polyols by reacting alkylene oxides with hydroxyl initiator compounds in the presence of catalysts of calcium, strontium, or barium salts of organic acids. Although such catalysts need not be removed before the resultant product is used in the preparation of polyurethanes, they are generally available in a mineral spirit solvent which further contains monoether glycols that act as initiators. Consequently, mono functional species with respect to the hydroxyl group are present in the mixture and if their concentration is too high, they distract from the properties of the polymers when they are intended for high performance applications. Alternatively, Yates et al. in U.S. Pat. No. 4,326,047 discloses a process for preparing similar polyols mixtures using these catalysts wherein the catalyst is first precipitated from the mineral spirits carrier and the glycol ether coupling agent. The resulting catalyst is solid and thus, it must be re-dissolved in the reaction medium for it to be effective. This extra step takes time and negatively affects the productivity of the reaction and the polydispersity of the product prepared.

The vast majority of polyols are obtained from different petrochemical processes and are considered virgin polyols. Examples of such polyols include those prepared from terephthaloyl radicals as described in U.S. Pat. No. 3,647,759 to Walker; U.S. Pat. No. 4,237,238 to DeGiuseppi et al.; and U.S. Pat. No. 4,346,229 to Derr et al. It has also been disclosed that polyols can be obtained by chemical recycling processes for PET bottles as described in U.S. Pat. No. 4,048, 104 to Svoboda et al. whereby pieces of poly(ethylene terephthalate) that is obtained from the collection of PET bottles are used to manufacture diethylene glycol and terephthaloyl radicals.

There are several known processes to chemically modified vegetable oils and produce triglycerides containing hydroxyl functional groups. One (1) method to prepare polyols from various vegetable oils is described in Brazil Pedido PI (2002) Application: BR 2000-5479 20001016 by Calderon Velasco, Rodrigo. It is based on transesterification of the fatty acids in the triglycerides with a polyol such as glycerin, trimethylolpropane, pentaerythritol, sorbitol, amino-alcohols, glycols including ethylene glycol, propylene glycol, diethylene glycol, and neopentyl glycol. Other hydroxylated compounds such as pentaerytol, -methylglucoside or sucrose are also suitable. Unfortunately, premature degradation occurs by this process due to high temperatures (200-240° C.) and a relatively long period of time in the tranesterification reaction. Furthermore, the resulting product distribution contains only glycerides and no low molecular weights linear polyols.

Another method described in U.S. Pat. No. 6,433,121, to Petrovic is based on a consecutive two-step process involving epoxidation and then hydroxylation of vegetable oils with peroxyacid to yield polyol mixtures. According to this method, the epoxide rings are open or hydroxylated with polyfunctional alcohols to yield secondary alcohols. Although epoxidized soy oil is available commercially, the reactivity of this oil is low since only secondary alcohols are obtained and these are inherently less reactive than primary alcohols. Furthermore, several hydroxyl groups per fatty acid residue are obtained by this route (at least these fatty acids that contain more than one double bond). Consequently, multiple numbers of hydroxyl groups having varying reactivity are present, which tend to complicate subsequent reactions and can even lead to premature gelation. These polyols have also been shown to exhibit poor functionality and thus, they must be mixed with other high functionality polyols so that when polymerized, sufficient cross-linking is achieved.

Hydroformylation of vegetable oils offers another method to prepare polyols described by Guo et al. in the *J. of Polym. and the Environ.* 10: 49-52 (2002). According to this method, an aldehyde functional vegetable oil is first obtained, which is then hydrogenated to alcohols. Polyurethanes prepared from these polyols had different mechanical properties depending on the hydroformylation catalyst that was used. Thus, rigid materials at room temperature were obtained with a rhodium catalyst while a cobalt catalyzed hydroformylation led to rubbery materials.

An alternative method for preparing primary polyols is based on oxidizing an olefin having a carbonyl group with molecular oxygen followed by hydrolysis and reduction of the acetal (or ketal) to an alcohol is described by Takahara, J. et al. in WO Application Patent 2002049999 (2002). This method is much more complicated and must run at high pressure and thus, is not very economical.

Another method described by Austin et al. in U.S. Pat. No. 4,314,088 is based on an oxidation process of the olefinic compounds to yield polyols using an organic hydroperoxide in the presence of $OsO_4$ and a NaBr co-catalyst. However, the use of toxic heavy metals requires careful operation and disposal protocols of the waste heavy metal residue, which render this method not very practical. Another oxidation process employs ozone to cleave and oxidize the double bonds in the vegetable oil and then reduce the decomposing ozonides to alcohols using $NaBH_4$ or similar reducing agents. Although the oxidation and cleavage of the double bonds are fast and effective, the subsequent reduction process is costly and not very useful commercially.

It is apparent from the foregoing that although polyols derived from various starting materials by a variety of processes have been disclosed, they either exhibit low levels of compatibility or are not sufficiently reactive or are not useful in the polymerization of polyurethanes and polyesters. Moreover, all the polyol mixtures obtained from vegetable or animal oils without complete cleavage of the double bonds are composed of relatively high molecular weight glyceride derivatives whereby complete cleavage of the double bonds in these oils lead to an unstable polyol mixture.

OBJECTS

It is therefore an object of the present invention to provide a mixture of polyols derived from raw materials that come from a source other than petroleum, since this is not renewable.

Another object of this invention is to provide a mixture comprising low molecular weight linear polyols and high molecular weight triglyceride functional polyols that is stable and does not phase separate upon standing or during the polymerization process.

An additional object of this invention is to provide a process for obtaining oleochemical primary polyols. The process is efficient, relatively simple and readily facilitates the conversion of raw materials into products.

Yet another object of the present invention is to provide a process for obtaining highly reactive primary polyols suitable for producing different types of polyurethane and polyester articles such as resins, coatings, elastomers, foams, etc. Such polyester polyols allow the preparation of these articles with no need to supplement the mixture with other polyols.

An additional object of the present invention is to provide a process for obtaining polyols that provide high degrees of cross-linking in said articles by the high functionality of the polyols mixture.

SUMMARY OF THE INVENTION

It has been discovered that blends of polyols by the present invention are single-phase liquid mixtures although they are composed of low equivalent weight linear hydroxyl functional radicals and high equivalent weight triglycerides primary capped polyols. The processing method is based on a catalytic ozonation whereby the double bonds of the unsaturated fatty acid residues are cleaved and reacted with a polyol in a one-step process to produce primary alcohol functional groups.

It is desirable to employ suitable polyols from renewable resources, such as vegetable oils, instead of petroleum-based chemicals. In addition to being environmentally friendly, vegetable oils are a stable source of materials that is readily available and which can be produced by less costly processes than petroleum-based polyols.

The present invention addresses the need to produce primary polyols suitable in these polymerizations by chemical modifications of vegetable oils. The catalytic oxidation process synthesizes polyol blends that are self-compatible and do not phase-separate on standing or during the polymerization process.

The invention provides a stable mixture of high and low molecular weight polyester polyols prepared by catalytic ozonation of vegetable oil containing unsaturated fatty acids in the presence of a hydroxylated compound. This primary polyol mixture is obtained by exposing the oil to ozone in the presence of an alkaline catalyst and an alcohol having two (2) or more hydroxyl groups. The reaction can be run with no solvent or in a solvent or dispersant which is not affected by the ozone. The polyester polyols mixture thus prepared is composed of hydroxyl functional triglycerides and low molecular weight, linear polyols. The particular composition of the polyol mixture depends on the type of oil and more specifically on the type and amount of the unsaturated fatty acids in the triglycerides. Thus, ozonation and cleavage of linoleic acid radical on a triglyceride in the presence of ethylene glycol will yield 2-hydroxyethyl nonanoate radical on the triglyceride and the linear (2-hydroxylethyl) hexanoate and bis(2-hydroxylethyl) malonate fragments.

In another embodiment, the invention is a process for preparing such mixtures of primary polyester polyols. The process comprises first, contacting a vegetable oil containing unsaturated fatty acid triglycerides with compounds having two (2) or more hydroxyl groups in the presence of an alkaline catalyst. The mixture is exposed to ozone at temperatures between room temperature and the freezing point of the oil for sufficient periods of time to allow the ozone to react with the unsaturated compounds. Under these conditions, the double bonds are cleaved and the new terminal ends are reacted with the hydroxyl compound through a new ester linkage.

The present invention relates to a composition derived from a vegetable oil comprising triglycerides having multiple ester linkages with more than three ester groups per glyceride group. Further, the present invention relates to a method for making a modified triglyceride which comprises: reacting vegetable oil with ozone in a reaction mixture in the presence of a hydroxylated compound and alkaline catalyst wherein the ozone and the vegetable oil react to cleave double bonds in fatty acid groups of the triglyceride, wherein the hydroxylated compound, in the presence of the catalyst, is added to terminal carbons of the cleaved double bonds through an ester covalent bond. Further, the present invention relates to a composition where additional diesters and mono-esters are present from the reaction of the hydroxylated compound with the cleaved portions of fatty acid groups not linked to the triglyceride. Still further, the present invention relates to a composition wherein the hydroxylated compound is selected from the group consisting of a mono-alcohol and mixtures thereof. Preferably, the invention relates to a composition wherein the hydroxylated compound is selected from the group consisting of polyols and mixtures thereof. Most preferably, the invention relates to a composition wherein the hydroxylated compound is selected from the group consisting of alcohol composed of hydrocarbon chains and mixtures thereof. Further, the invention relates to a composition wherein the hydroxylated compound is selected from the group consisting of an alcohol containing heteroatoms and mixtures thereof. Still further, the invention relates to a composition wherein the hydroxylated compound is selected from the group consisting of a linear, branched, hyperbranched, or dendritic alcohol and mixtures thereof. Further still, the invention relates to a composition wherein the vegetable oil consists of triglycerides containing unsaturated double bonds.

Preferably, the invention relates to a composition wherein the vegetable oil is selected from the group consisting of triglycerides derived from soybean oil, safflower oil, linseed oil, corn oil, sunflower oil, olive oil, canola oil, sesame oil, cottonseed oil, palm oil, peanut oil, coconut oil, rapeseed oil, tung oil, castor oil, fish oil and mixtures thereof. Most preferably, the invention relates to a composition containing primary alcohols derived from the reaction of the triglycerides and the hydroxylated compound. Still further, the invention relates to a composition wherein a hydroxyl number is between 0.5 and 5.0. Further still, the invention relates to a composition containing primary amine groups derived from the reaction of said triglycerides and amino alcohols as the hydroxylated compound. Still, the invention relates to a composition wherein any low molecular weight compounds are removed from the composition to yield a low volatile composition. Further, the invention relates to a composition wherein solvent, antifoam agents, rheology modifiers, inorganic filler, and other additives, reactants or process aids are present. Further still, the invention relates to a composition consisting essentially of the reaction mixture without purification. Still further, the invention relates to a method wherein ozone is derived from an oxygen containing atmosphere. Further, the invention relates to a method wherein an alcohol is used as a solvent.

Preferably, the invention relates to a process wherein the said catalyst is an alkaline compound selected from the group consisting of: (a) a base; (b) an amine; (c) a metal oxide; and (d) mixtures thereof. Most preferably, the invention relates to a method wherein the catalyst is soluble in the reaction mixture. Further, the invention relates to a method wherein the catalyst is insoluble in the reaction mixture. Still further, the invention relates to a method of making a vegetable oil-based primary polyol comprising ozonizing a vegetable oil in the presence of a polyol and the catalyst.

DESCRIPTION OF PREFERRED EMBODIMENTS

The stable polyester-polyols mixtures of the invention are generally prepared by contacting ozone gas with a vegetable oil in the presence of alcohol radicals containing two (2) or more hydroxyl groups and an alkaline catalyst under appropriate conditions for the unsaturated bonds to cleave and to add to the alcohol at the new terminal chain ends.

The use of ozone to cleave organic double bonds is well known to those skilled in the art. Ozone is a very powerful oxidation agent and it readily attacks and cleaves double bonds in alkenes. Aside from its high oxidation potential, ozone oxidation is convenient since unreacted ozone simply decomposes back to oxygen and no special neutralization or separation are required at the end of the reaction. Furthermore, since ozone is being produced "on site" it does not require complex logistics in transport, storage and disposal as many other oxidation agents. However, unlike uncatalyzed ozonation that yields a mixture of aldehyde and ketones functional radicals, the alkaline catalyzed ozonation, in accordance with our invention, results in the formation of ester linkages between the alcohol and the new chain ends of the cleaved double bonds.

Any vegetable or animal oil may be used in this process. Examples of such oils that may be used include, but are not limited to, soybean oil, safflower oil, linseed oil, corn oil, sunflower oil, olive oil, canola oil, sesame oil, cottonseed oil, palm oil, peanut oil, coconut oil, rapeseed oil, tung oil, castor oil, fish oil, or any mixtures thereof. Additionally, any partially hydrogenated vegetable oils or genetically modified vegetable oils can also be used. Examples of partially hydrogenated vegetable oils or genetically modified vegetable oils include, but are not limited to, high oleic safflower oil, high oleic soybean oil, high oleic peanut oil, high oleic sunflower oil and high erucic rapeseed oil (crambe oil). Alternatively, any fatty acids or fatty ester containing unsaturation in their structure, either individually or as mixtures, can also be used. The iodine values of these vegetable oils range from about 40 to 240 and more preferably from about 80 to 240. When vegetable oils having lower iodine values are used to make vegetable oil-based polyols, polyols with lower hydroxyl numbers are obtained.

Preferable hydroxyl compounds, which are employed to prepare the polyester polyols, are organic compounds having at least two (2) active hydrogens. Preferred compounds include but are not limited to glycols, linear polyols, glycerin, trimethylol propane, pentaerythritol, glucosides, sugars, cathecols, and the like. Particularly, suitable glycols include ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol and various hexane diols, mixtures thereof and the like.

The catalysts used in preparing the polyester-polyols mixture of this invention are solid or liquid alkaline compounds. Examples of such catalysts include but are not limited to alkali metal hydroxides (such as LiOH, NaOH, KOH and CsOH), organic amines (such as butyl amine, diethyl amine, pyridine, or 4-dimethylamino-pyridine), various salts derived from a strong base and a weak acid (such as calcium carbonate and magnesium carbonate), compounds composed of metal oxides having alkaline surface (such as MgO). The salt catalysts may be prepared by contacting the appropriate ratio of a strong base such as calcium hydroxide with a $C_{6-10}$ carboxylic acid and bubbling carbon dioxide through the mixture to form carbonate moieties. The catalysts suitable for this invention can either be soluble in the reaction mixture, known in the art as homogeneous catalyst or it can be dispersed as fine particles known as heterogeneous catalyst.

The concentration of the catalyst depends on the alkalinity of the particular catalyst used and the experimental conditions of the reaction. Thus, provided that a soluble and strong alkaline catalyst like NaOH is used, a concentration of 0.1 to 1.0 wt. % is sufficient when the reaction temperature is between 0° C. and 25° C., an ozone/oxygen flow rate of 0.25 ft$^3$/min. is used and the concentration of ozone in the gas atmosphere is about 6%. When a heterogeneous catalyst is used, the average particle size and the particle size distribution must also be considered as smaller particles provide a higher total surface area than identical concentrations of the catalyst with larger particles. The amount of catalyst is therefore adjusted to provide maximum formation of ester linkages between the alcohol radicals and the new chain ends that are formed as a result of the cleavage of the double bonds as a result of the ozone attack.

Soluble (homogeneous) catalysts are neutralized at the end of the reaction with acidic compounds such as acetic acid, carbon dioxide and the salt is then separated from the product by washing with water and separating the desired oil phase from the water phase. When heterogeneous catalyst is used and it is dispersed in the reaction mixture as fine particles or present as a separate phase, the product is purified simply by filtration of the catalyst phase and removing it from the reaction product. In this case, the recovered catalyst can be re-used.

Solvents or dispersants are not needed but can be used to control the viscosity of the reaction mixture or to enhance the compatibility of the various components in the reaction mixture. Such solvents or dispersants can be mineral spirits, silicone oil or chlorinated organic compounds commonly used in ozonolysis reaction. Preferably the solvent should be stable to ozone and does not have unsaturation. In a preferred embodiment, no solvent or dispersant is used.

Examples of alcohols or alcohol mixtures that may be used in the reaction include, but are not limited to, glycols such as ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol and various hexane diols and mixtures thereof. Other alcohols including low molecular weight polyols, glycerin, trimethylol propane, pentaerythritol, glucosides, sugars, cathecols, and the like are also appropriate and can be used. Preferably, the alcohol used in the hydroxylation reaction has multiple hydroxyl groups and is miscible in the reaction mixture under the process conditions. It is important to employ an excess amount of alcohol during the hydroxylation step so as to prevent side reactions that will degrade from the purity of the desired polyol product. Typical side reactions are known to those skilled in the art and include polymerization, cross-linking, and the formation of products having higher viscosities.

The catalytic ozonation reaction occurs at approximately room temperature or between about 0° C. and 30° C. During the introduction of ozone, the temperature of the reaction can rise and therefore cooling should be applied. The extent to which the temperature rises depends upon the rate of the reaction, the temperature of the ozone/gas mixture, and the presence of solvent. The temperature can be controlled and maintained by contacting the reaction vessel with ice, coolant, or any other cooling methods familiar to the person expert in the art. It is preferable to maintain the reaction temperature close to 0° C. for safety as a balance between the solubility of ozone in the reaction medium and the rate of the reaction.

In a typical process, ozone is produced by passing dry oxygen (0.25 ft$^3$/min) through an ozone generator (Praxair Trailigaz generator model number OZC-1001), Cincinnati, Ohio, set up to yield about 6 wt. % ozone in oxygen. This ozone/oxygen atmosphere is introduced into the reaction medium as small gas bubbles by passing the gas stream through a fritted disc having fine pores. The formation of these small gas bubbles improved the dispersion of ozone within the reaction medium. The dispersion of the fine gas bubbles is further improved by stirring the reaction mixture using a mechanical stirrer equipped with an appropriate stirrer. Any unreacted ozone that escaped from the reaction without reacting with the oil is destroyed by venting it through an exhaust outlet and into an aqueous potassium iodide solution.

This method for making vegetable oil-based polyols is illustrated in the following Examples. These Examples are not meant in any way to limit the scope of this invention.

EXAMPLES

Example 1

Soybean oil (200 g), ethylene glycol (150 g) and $CaCO_3$ (20 gr) were placed in a 500 mL glass reactor and maintained at 0° C. in an ice/water bath under continuous stirring. Ozone was produced by passing oxygen through the Praxair Trailigaz OZOBLOC Model OZC-1001 ozone generator. The operating conditions of the generator were set to produce an atmosphere containing 6-10 wt % ozone at 12 psi that was fed into the reactor through the fritted disc as small bubbled at a flow rate of 0.35 ft$^3$/min. The exhaust outlet from the reactor was connected to a potassium iodide aqueous solution trap in order to destroy excess ozone that has not been reacted. After 50 minutes reaction time, the ozone generator was switched off, the reaction mixture was allowed to warm up to room temperature and then washed with about 500 mL distilled water to remove any excess unreacted ethylene glycol. The $CaCO_3$ catalyst was then filtered out through a fine filter paper and the product was dried over molecular sieves for 48 hours.

The product mixture was characterized by FTIR and NMR and the results indicate that 27.5% of the double bonds have been cleaved. Hydroxyl functionality, defined here as the average number of hydroxyl groups in 1 mole of triglyceride was derived from the hydroxyl number (defined according to ASTM test method D1957-86 as the number of mg of potassium hydroxide equivalent to acetic anhydride consumed in the acetylation of 1 g of sample) was 0.25. The polyol product mixture was stable for 1 month at room temperature and no visible phase separation was observed.

Example 2

Soybean oil (200 g), ethylene glycol (150 g) and $CaCO_3$ (20 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 100 minutes reaction time, the ozone generator was switched off, the reaction mixture was allowed to warm up to room temperature and then washed with about 500 mL distilled water to remove any excess unreacted ethylene glycol. The $CaCO_3$ catalyst was then filtered out through a fine filter paper and the product was dried over molecular sieves for 48 hours.

The product mixture was characterized by FTIR and NMR and the results indicate that 40% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 2.6. The polyol product mixture was stable for 1 month at room temperature and no visible phase separation was observed.

Example 3

Soybean oil (200 g), ethylene glycol (150 g) and $CaCO_3$ (20 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 200 minutes reaction time, the ozone generator was switched off, the reaction mixture was allowed to warm up to room temperature and then washed with about 500 mL distilled water to remove any excess unreacted ethylene glycol. The $CaCO_3$ catalyst was then filtered out through a fine filter paper and the product was dried over molecular sieves for 48 hours.

The product mixture was characterized by FTIR and NMR and the results indicate that 66% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 4.5. The polyol product mixture was stable for 1 month at room temperature and no visible phase separation was observed.

Example 4

Soybean oil (200 g), ethylene glycol (150 g) and $CaCO_3$ (20 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol. The $CaCO_3$ catalyst was then filtered out through a fine filter paper and the product was dried over molecular sieves for 48 hours.

The product mixture was characterized by FTIR and NMR and the results indicate that 89.5% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 5.2. The polyol product mixture was stable for 1 month at room temperature and no visible phase separation was observed.

Example 5

Soybean oil (200 g), ethylene glycol (150 g) and pyridine (35 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol and pyridine. The product was dried over molecular sieves for 48 hours.

The product mixture was characterized by FTIR and NMR and the results indicate that 79% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 4.8. The polyol product mixture was stable for 1 month at room temperature and no visible phase separation was observed.

Example 6

Soybean oil (200 g), ethylene glycol (150 g) and 4-dimethylamino-pyridine (35 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol and 4-dimethylamino-pyridine. The product was dried over molecular sieves for 48 hours.

The product mixture was characterized by FTIR and NMR and the results indicate that 85% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 5.1. The polyol product mixture was stable for 1 month at room temperature and no visible phase separation was observed.

Comparative Example 7

Soybean oil (200 g), ethylene glycol (150 g) and sodium hydroxide (30 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After a few minutes saponification (fatty acid salt formation) of the oil was observed and the reaction was terminated. This care might be taken not to saponify the oil with a strong base.

Example 8

Soybean oil (200 g), ethylene glycol (150 g) and magnesium oxide (35 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol. The MgO catalyst was then filtered out through a fine filter paper and the product was dried over molecular sieves for 48 hours.

The product mixture was characterized by FTIR and NMR and the results indicate that 88% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 5.3. The polyol product mixture was stable for 1 month at room temperature and no visible phase separation was observed.

Example 9

Soybean oil (200 g), ethylene glycol (150 g) and triethylamine (35 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol and triethylamine. The product was dried over molecular sieves for 48 hours.

The product mixture was characterized by FTIR and NMR and the results indicate that 80% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 4.8. The polyol product mixture was stable for 1 month at room temperature and no visible phase separation was observed.

Example 10

Soybean oil (200 g), ethylene glycol (150 g) and CaCO$_3$ (20 gr) were placed in a 500 mL glass reactor and maintained at 25° C. under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol. The CaCO$_3$ catalyst was then filtered out through a fine filter paper and the product was dried over molecular sieves for 48 hours.

The product mixture was characterized by FTIR and NMR and the results indicate that 63% of the double bonds have been cleaved. Hydroxyl functionality, defined here as the average number of hydroxyl groups in 1 mole of triglyceride, was derived from the hydroxyl number (defined according to ASTM test method D1957-86 as the number of mg of potassium hydroxide equivalent to acetic anhydride consumed in the acetylation of 1 g of sample) was 4. The polyol product mixture was stable for 1 month at room temperature and no visible phase separation was observed.

Example 11

Soybean oil (200 g), low molecular weight polyethylene glycol (trade name PEG200, 150 g) and CaCO$_3$ (20 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol. The CaCO$_3$ catalyst was then filtered out through a fine filter paper and the product was dried over molecular sieves for 48 hours.

The product mixture showed large hydroxyl absorption in the FTIR spectrum and only residual double bonds functionality. It was stable for 1 month at room temperature with no visible phase separation and was formulated into flexible polyurethane foam.

Example 12

Soybean oil (200 g), medium molecular weight polyethylene glycol (trade name PEG400, 150 g) and CaCO$_3$ (20 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol. The CaCO$_3$ catalyst was then filtered out through a fine filter paper and the product was dried over molecular sieves for 48 hours.

The product mixture showed large hydroxyl absorption in the FTIR spectrum and only residual double bonds functionality. It was stable for 1 month at room temperature with no visible phase separation and was formulated into flexible polyurethane foam.

Example 13

Soybean oil (200 g), high molecular weight polyethylene glycol (trade name PEG600, 150 g) and CaCO$_3$ (20 gr) were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol. The CaCO$_3$ catalyst was then filtered out through a fine filter paper and the product was dried over molecular sieves for 48 hours.

The product mixture showed large hydroxyl absorption in the FTIR spectrum and only residual double bonds functionality. It was stable for 1 month at room temperature with no visible phase separation and was formulated into flexible polyurethane foam.

Comparative Example 14

Soybean oil (200 g), ethylene glycol (150 g) and no catalyst were placed in a 500 mL glass reactor and maintained at 0° C. in an ice/water bath under continuous stirring. Ozone was produced as described in Example 1 and was fed into the reactor through the fritted disc as small bubbles at a flow rate of 0.35 ft$^3$/min. The exhaust outlet from the reactor was connected to a potassium iodide aqueous solution trap in order to destroy excess ozone that has not been reacted. After 400 minutes reaction time, the ozone generator was switched off, the reaction mixture was allowed to warm up to room temperature and then washed with about 500 mL distilled water to remove any excess unreacted ethylene glycol and the product was dried over molecular sieves for 48 hours.

The product mixture was characterized by FTIR and the results indicate that it contains a mixture of various carboneceous compounds primarily aldehydes and carboxylic acids. The mixture separated into two (2) phases within 1 week when left undisturbed at room temperature.

It is intended that the foregoing description be only illustrative of the present invention and that the present invention be limited only by the hereinafter appended claims.

We claim:

1. A composition derived from a vegetable oil, the composition comprising:
    (a) a triglyceride comprising:
        (i) an ester of an alkaline-catalyzed, ozone-cleaved unsaturated fatty acid comprising a terminal carbon atom, wherein the terminal carbon atom is covalently linked through an ester reaction product of (A) the alkaline-catalyzed, ozone-cleaved unsaturated fatty acid and (B) a hydroxylated compound having at least two hydroxyl groups; and
        (ii) more than three ester groups per triglyceride molecule.

2. A method for making a modified triglyceride, the method comprising:
    reacting a vegetable oil with ozone in a reaction mixture in the presence of a hydroxylated compound and an alkaline catalyst, wherein: (i) the ozone and the vegetable oil react to cleave double bonds in fatty acid groups of the vegetable oil, and (ii) the hydroxylated compound, in the presence of the catalyst, is added to terminal carbons of the cleaved double bonds through an ester covalent bond.

3. The composition of claim 1 further comprising: (b) additional diesters and mono-esters.

4. The composition of claim 3 wherein the hydroxylated compound is selected from the group consisting of polyols and mixtures thereof.

5. The composition of claim 3 wherein the hydroxylated compound is selected from the group consisting of alcohols composed of hydrocarbon chains and mixtures thereof.

6. The composition of claim 3 wherein the hydroxylated compound is selected from the group consisting of alcohols containing heteroatoms and mixtures thereof.

7. The composition of claim 3 wherein the hydroxylated compound is selected from the grouping consisting of linear alcohols, branched alcohols, hyperbranched alcohols, dendritic alcohols and mixtures thereof.

8. The composition of claim 3 wherein the vegetable oil consists of triglycerides containing unsaturated double bonds.

9. The composition of claim 3, wherein the vegetable oil is selected from the group consisting of triglycerides derived from soybean oil, safflower oil, linseed oil, corn oil, sunflower oil, olive oil, canola oil, sesame oil, cottonseed oil, palm oil, peanut oil, coconut oil, rapeseed oil, tung oil, castor oil, fish oil, and mixtures thereof.

10. The composition of claim 3 containing primary alcohols.

11. The composition of claim 3 wherein a hydroxyl number of the composition is between 0.5 and 5.0.

12. The composition of claim 3 containing primary amine groups.

13. The composition of claim 1 wherein the composition is a low volatile composition that is free of low molecular weight diester and mono-ester compounds.

14. The composition of claim 3 further comprising at least one of a solvent, an antifoam agent, a rheology modifier, and an inorganic filler.

15. The method of claim 2 wherein the ozone is derived from an oxygen-containing atmosphere.

16. The method of claim 2 wherein the reaction mixture further comprises a solvent selected from the group consisting of alcohols, mineral spirits, silicone oil, chlorinated organic compounds, and combinations thereof.

17. The method of claim 2 wherein the alkaline catalyst is an alkaline compound selected from the group consisting of: a base, an amine, a metal oxide, and mixtures thereof.

18. The method of claim 2 wherein the alkaline catalyst is soluble in the reaction mixture.

19. The method of claim 2 wherein the alkaline catalyst is insoluble in the reaction mixture.

20. A method of making a vegetable oil-based primary polyol, comprising ozonizing a vegetable oil in the presence of a polyol and catalyst.

21. The composition of claim 1, wherein the triglyceride comprises at least two of the esters of component (i).

22. The composition of claim 1, wherein the triglyceride is derived from a vegetable oil selected from the group consisting from soybean oil, safflower oil, linseed oil, corn oil, sunflower oil, olive oil, canola oil, sesame oil, cottonseed oil, palm oil, peanut oil, coconut oil, rapeseed oil, tung oil, castor oil, fish oil, and mixtures thereof.

23. The composition of claim 1, wherein the triglyceride is derived from a vegetable oil comprising soybean oil.

24. The composition of claim 1, wherein the hydroxylated compound comprises a polyol.

25. The composition of claim 1, wherein the hydroxylated compound is selected from the group consisting of glycols, linear polyols, glycerin, trimethylol propane, pentaerythritol, glucosides, sugars, catechols, and combinations thereof.

26. The composition of claim 1, wherein the hydroxylated compound is selected from the group consisting of ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol, hexane diols, and combinations thereof.

27. The method of claim 2, wherein the vegetable oil consists of triglycerides containing unsaturated double bonds.

28. The method of claim 2, wherein the vegetable oil is selected from the group consisting of triglycerides derived from soybean oil, safflower oil, linseed oil, corn oil, sunflower oil, olive oil, canola oil, sesame oil, cottonseed oil, palm oil, peanut oil, coconut oil, rapeseed oil, tung oil, castor oil, fish oil, and mixtures thereof.

29. The method of claim 2, wherein the vegetable oil comprises soybean oil.

30. The method of claim 2, wherein the hydroxylated compound comprises a polyol.

31. The method of claim 2, wherein the hydroxylated compound is selected from the group consisting of glycols, linear polyols, glycerin, trimethylol propane, pentaerythritol, glucosides, sugars, catechols, and combinations thereof.

32. The method of claim 2, wherein the hydroxylated compound is selected from the group consisting of ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, neopentyl glycol, hexane diols, and combinations thereof.

33. The method of claim 2, wherein the reacting step provides a reaction product comprising (i) the modified triglycerides and (ii) diesters and mono-esters resulting from the reaction of the hydroxylated compound with cleaved portions of the fatty acid groups not linked to the modified triglycerides.

34. The method of claim 2, comprising performing the reacting step at a temperature between the freezing point of the vegetable oil and room temperature.

35. The method of claim 2, comprising performing the reacting step at a temperature between 0° C. and room temperature.

36. The method of claim 20, wherein the vegetable oil-based primary polyol comprises ester linkages between the ozonized vegetable oil and the polyol.

37. The method of claim 20, wherein the catalyst comprises an alkaline catalyst.

* * * * *

UNITED STATES PATENT AND TRADEMARK OFFICE
CERTIFICATE OF CORRECTION

PATENT NO. : 7,589,222 B2  Page 1 of 1
APPLICATION NO. : 11/363101
DATED : September 15, 2009
INVENTOR(S) : Narayan et al.

It is certified that error appears in the above-identified patent and that said Letters Patent is hereby corrected as shown below:

Column 1, line 44, after "Even more" and before "compounds" insert --severe is the tendency of catalysts and other additive--.

Signed and Sealed this

Sixteenth Day of February, 2010

David J. Kappos
*Director of the United States Patent and Trademark Office*